United States Patent [19]

Kasday

[11] Patent Number: 4,710,760
[45] Date of Patent: Dec. 1, 1987

[54] PHOTOELASTIC TOUCH-SENSITIVE SCREEN

[75] Inventor: Leonard R. Kasday, East Windsor, N.J.

[73] Assignee: American Telephone and Telegraph Company, AT&T Information Systems Inc., Murray Hill, N.J.

[21] Appl. No.: 709,554

[22] Filed: Mar. 7, 1985

[51] Int. Cl.$^4$ ............................................. G09G 1/00
[52] U.S. Cl. .................................... 340/712; 178/18; 250/221; 250/225
[58] Field of Search ................... 340/712, 365 P, 709; 178/18, 19; 250/221, 341, 225; 350/6.5, 6.9, 6.91, 273, 371; 356/141, 152

[56] References Cited

U.S. PATENT DOCUMENTS

| | | | |
|---|---|---|---|
| 4,008,960 | 2/1977 | Reytblatt | 356/33 |
| 4,204,262 | 5/1980 | Fitelson et al. | 364/822 |
| 4,507,557 | 3/1985 | Tsikos | 250/221 |
| 4,553,842 | 11/1985 | Griffin | 340/712 |
| 4,558,313 | 12/1985 | Garwin et al. | 340/709 |
| 4,568,182 | 2/1986 | Modjallal | 178/18 |

OTHER PUBLICATIONS

Nicholas Negroponte et al., *One-Point Touch Input of Vector Information for Computer Displays*, US Army Research Institute for Behavioral & Social Sciences, Oct. 1978, TR-78-TH, pp. 1-17.
W. B. Spillman, Jr., "Multimode Fiber-Optic Accelerometer Based on the Photoelastic Effect," *Applied Optics*, vol. 21, No. 15, Aug. 1, 1982, pp. 2653-2655.
Terry Costlow, "Retroreflectors Cut Component Count in CRT Touch Panels," Electronic Design, Sep. 15, 1983, pp. 41-42.
Wesley R. Iversen, "Hands-On Gestures Manipulate Objects on Display Screen," *Electronics Week*, Jul. 23, 1984, pp. 50-51.

*Primary Examiner*—John W. Caldwell, Sr.
*Assistant Examiner*—Mahmoud Fatahi-Yar
*Attorney, Agent, or Firm*—Frederick B. Luludis

[57] ABSTRACT

A touch-sensitive device comprising a photoelastic screen having light reflecting edges and a unique light emitting/receiving module placed at two of the four corners of the screen advantageously determines the location at which a force is applied to the screen. Circularly and linearly polarized light focused into the photoelastic screen by the modules reflects off the edges of the screen and is returned to the modules where it is absorbed by a circular polarizer. The polarization of light passing through a point at which the screen is touched is changed thereby allowing these rays or signals to pass through each module's absorber. The location as well as the magnitude and direction of the force imparted to the screen by the touch is then determined from the changes in the signals that pass through the absorber.

20 Claims, 9 Drawing Figures

PHOTOELASTIC TOUCH-SENSITIVE SCREEN

TECHNICAL FIELD

This invention relates to the field of touch-sensitive screens.

BACKGROUND OF THE INVENTION

Touch-sensitive screens are placed in proximity to a video screen or cathode ray tube (CRT) for determining, for example, which item of a menu of displayed items has been touched (selected) by the terminal user. The well known Carroll touch screen, disclosed in U.S. Pat. No. 4,267,443, is one such example. The Carroll touch screen uses an array of photodiodes and an array of light sources, such as light emitting diodes, arranged in an x-y matrix to determine which portion or point on the CRT screen is touched by the user.

Other prior art touch-screens use clear compliant material or plate glass as a CRT overlay. These devices rely on the total internal reflection of the CRT raster signal to locate the x and y coordinates of the point on the overlay that is touched by the user. The method of triangulation can also be used to determine the location of the touch point. For example, the Illinois Tool Work's Cyclops touch-sensitive screen uses, among other things, a rotating beam, a beam splitter and a microprocessor which notes the position of the rotating beam when the overlay is touched. It next determines which light beams have been broken by the user's finger and then determines the location of the touch point using triangulation. While this arrangement may be useful, it nonetheless employs mechanical devices, such as the rotating beam, which require frequent adjustments and which tend to fail over time due to fatigue.

It appears that the prior art of touch screens is generally content to just determine the point at which the screen is touched and overlooks other useful information that can be obtained from the force that is applied by the user when touching the screen, for example, whether the applied force is in an upward, downward or sideways direction. Such information could be useful for controlling, for example, the movement of the screen cursor as disclosed in an article appearing in *Electronics Week*, Volume 57, No. 15, July 31, 1984. The touch-sensitive screen disclosed in this article uses strain gauges, one positioned at each corner of the screen, for determining the location, pressure and shear forces applied to the screen when the user touches it. However, this device also employs mechanical devices, such as strain gauges, which, as mentioned above, tend to be problematical.

SUMMARY OF THE INVENTION

The problems associated with prior art touch screens are obviated in a touch screen arrangement in which, in accordance with the invention, the location of a force applied at a point on the screen, which is comprised of a body of photoelastic material into which polarized signals are directed, is determined from changes in the polarization of those of the polarized signals which pass through the point.

Further, the magnitude and direction of the force imparted to the screen, i.e., the total force and its normal and tangential components, may also be advantageously determined from the changes in the polarization of the polarized signals. This aspect of the invention may be used illustratively to track the direction that the user is pushing on the screen and is therefore highly useful in CRT graphic applications.

As another feature of the invention, a unique light emitting-receiving module is placed illustratively at a corner of the screen. The module is arranged to direct polarized signals into the photoelastic material and to receive these signals after they have traveled through the screen. In accordance with another feature of the invention, the module is arranged to absorb returning polarized signals whose polarization has not been changed and to collect returning polarized signals whose polarization has been changed. The module outputs signals indicative of the changes in the polarization of the collected signals, which are used by a processor to determine the location of the touch point. The side edges of the screen are arranged in accordance with another aspect of the invention to reflect polarized signals toward the emitting module after they have traversed the screen.

In particular, the top and side edges of the screen are formed from a plurality of reflective wedges in which illustratively the pitch of each wedge forming the top edge is different and in which the pitch of each wedge forming a side edge is also different. The light emitting-receiving module is formed from a plurality of lenses and polarizers which operate to focus signals of particular polarizations into the photoelastic material, to absorb unchanged polarized signals and to pass and collect changed polarized signals. The processor actually receives signals from two such modules, which are placed at two of the four corners of the screen to enhance the resolution in locating the point of touch and the values of the above mentioned forces.

DETAILED DESCRIPTION

Figure 1:
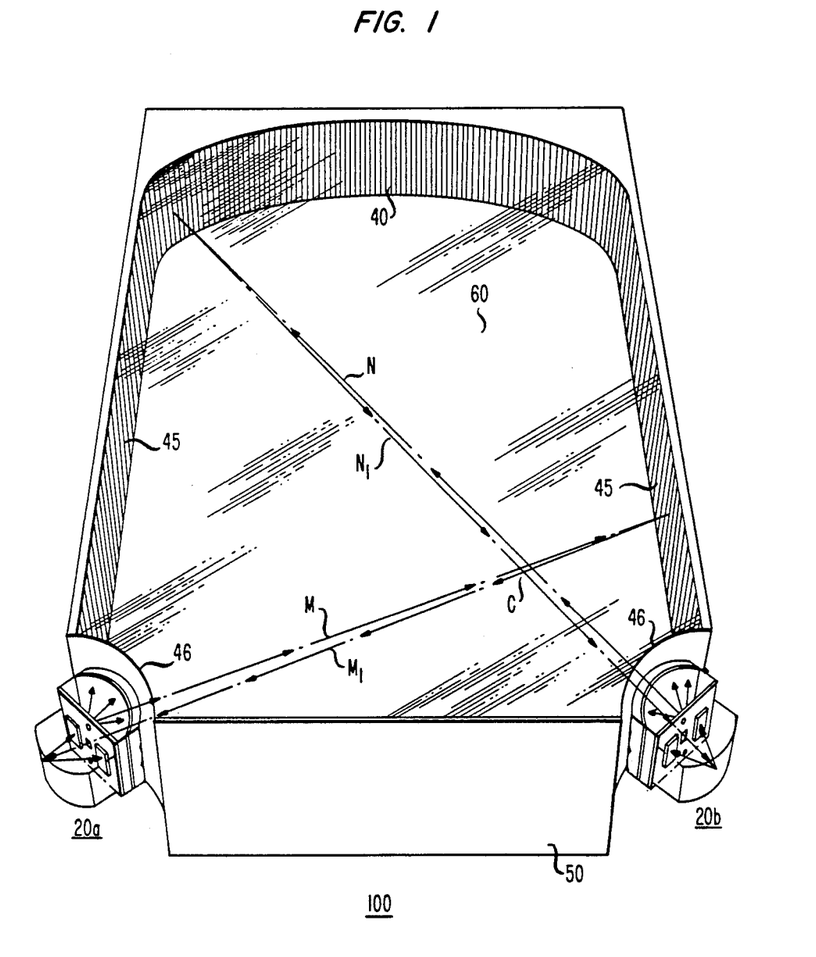
FIG. 1 is a front perspective view of a touch-sensitive screen embodying my invention.

FIG. 1 shows, in accordance with the invention, photoelastic touch-sensitive, or tactile, screen 100 adapted to be laid over a conventional display screen, such as a CRT screen. The depth of screen 100 has been exaggerated to more clearly illustrate the invention. Screen 100 comprises light emitter-detector modules 20*a* and 20*b*, Fresnel type mirrors 40 and 45, and photoelastic material 60 filling the region bounded by Fresnel mirrors 40 and 45 and the non-reflective bottom edge, or wall, 50.

Photoelastic material 60 can be, for example, silicon, such as General Electric's SYLGARD, or rubber, such as polyurethane rubber manufactured by Photolastic Inc. Photoelastic material 60 is not normally birefringent but becomes so when stressed, such as when a force is applied to it. Such stress-induced birefringence causes the polarization of light rays, or signals, passing through the point of stress to change. As will be discussed below, it is this characteristic of photoelastic material 60 that is advantageously used in accordance with the invention to determine the magnitude, direction and location of a force applied to the surface of screen 100.

Fresnel mirrors 40 and 45, as will be discussed below, are each formed by a plurality of light reflecting wedges which reflect, or return, light signals impinging thereon back to their source. The pitch of the wedges forming mirrors 40 and 45 increases illustratively between adjacent wedges, for example, the pitch of the wedges forming each mirror 45 increases, starting with the wedge nearest to the adjacent one of modules 20a and 20b.

Modules 20a and 20b, which will be discussed in detail below, are identical units and are arranged to focus light rays, such as light rays M and N, into material 60. (It should be understood, of course, that each one of modules 20a and 20b emits a bundle of light rays which enter material 60 of which, in the interest of clarity, only light rays M and N are shown.) Light ray M (N) represents a circularly polarized light ray and a linearly polarized light ray that are alternately focused into material 60 by module 20a (20b). These light rays travel through photoelastic material 60 and impinge on mirrors 45 and 40, which reflect the light rays $M_1$ and $N_1$ back to modules 20a and 20b, respectively.

It is well known that light is regarded as a wave constituting electric and magnetic fields which are transverse to the line of the propagating wave. If the phase difference between the components of, say, the electric vector is zero (or any multiple of $\pi$), then the resulting light is said to be linearly polarized; if the phase difference is $\pi/2$, then the resulting light is said to be circularly polarized.

It is also well known that the apparent direction of rotation of the electric vector of circularly polarized light changes when it is reflected by a surface, such as, in the present arrangement, mirrors 40 and 45. The apparent direction of rotation of circularly polarized light as seen by an observer looking toward the source of the light is viewed as being a right-hand rotation or left-hand rotation.

Circularly and linearly polarized light returning to modules 20a and 20b is generally absorbed, or blocked, by an analyzer, or absorber, contained within each module 20a and 20b. The transmission axis of each analyzer is oriented to block circularly polarized light reflected by mirrors 40 and 45 and to partially block linearly polarized light that is also reflected by these mirrors of screen 100. Light waves which normally pass through an absorber when no force is applied to screen 100 are treated as being scattered light or noise. As will be shown below, it is illustratively the circularly polarized light that is used to determine the total force applied at a point on material 60 and it is illustratively the linearly polarized light that is used to determine the normal component of that force. The former polarization is used to determine the total force, since it is sensitive to all directions of stress that may be applied to material 60, whereas the latter polarization is sensitive to stresses applied parallel to it.

Signals whose polarization has changed pass through the module absorber and are collected by the associated module. Each module 20a and 20b outputs signals indicative of the relative strength, or level, of the collected light signals.

As will be explained below in detail, the coordinates of point C, at which it is assumed that a force is applied to screen 100, are determined through triangulation, using angles derived from the electrical signals outputted by modules 20a and 20b. Further, the total force applied to material 60 at point C, as well as the normal and tangential components of the force, are derived from changes in the levels of these outputted signals.

Figure 4:
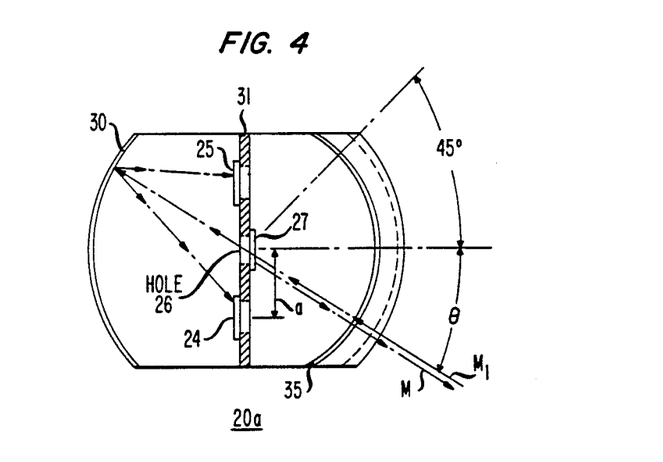
FIG. 4 is a top view of the module illustrated in FIG. 3.

Briefly referring now to FIG. 4, there is shown a top view of module 20a with light ray M leaving module 20a and reflected ray $M_1$ entering module 20a. Since modules 20a and 20b are identical units, any discussion of module 20a is equally applicable to module 20b.

As will be explained below, if the polarization of returning circularly or linearly polarized light, as represented by ray $M_1$, has changed sufficiently, it will pass through absorber 35 and hole 26 in printed wiring board 31 and impinges on reflective surface 30. Surface 30 reflects the impinging rays onto photodetectors, or photodiodes, 24 and 25 which output current signals $I_{24}$ and $I_{25}$, respectively. The magnitudes of current signals $I_{24}$ and $I_{25}$ are proportional to the amount of light received by photodiodes 24 and 25, respectively.

The amount of reflected light of ray $M_1$ reaching photodetectors 24 and 25 relates to the angle $\theta$ between a vertical plane passing through the center of module 20a and ray $M_1$. The angle $\theta$ can be determined from the following relationship:

$$\theta = \arcsin \frac{R}{2a} \frac{\beta^{\frac{1}{2}} - 1}{\beta^{\frac{1}{2}} + 1} \tag{1}$$

$$\text{where } \beta = \frac{\Delta I_{25}}{\Delta I_{24}}, \text{ and} \tag{2}$$

where "a" is the distance between the center of each one of photodetectors 24 and 25 and the center of module 20a and where R is the radius of curvature of both the front and back surfaces of module 20a. Equation (1) assumes that the value of R is much greater than the value of "a". The value of "R" can be, typically, 5a.

Triangulation

Figure 2:
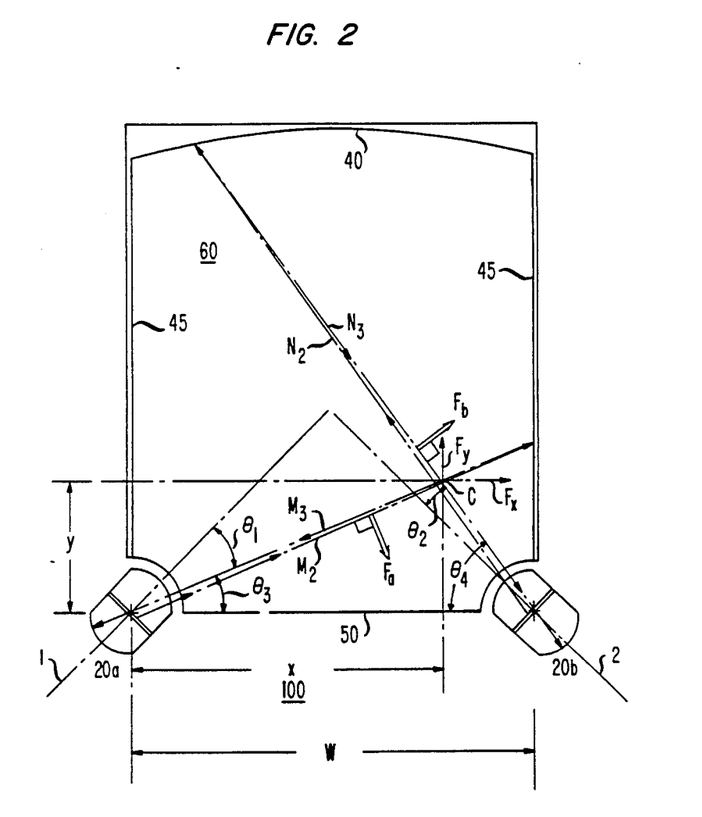
FIG. 2 is a schematic diagram of the touch-sensitive screen shown in FIG. 1 and illustrates the derivation of the components of a force applied to the touch-sensitive screen.

Turning now to FIG. 2, there is shown a schematic diagram of screen 100 with light rays $M_2$ and $N_2$ emitted by module 20a and module 20b, respectively. Light ray $M_2$ is representative of light rays emitted by alternately pulsed LEDs 27 and 28 (discussed below) contained within module 20a, reflecting off surface 45 and returning to module 20a as light ray $M_3$. Light ray $N_2$ is representative of light rays emitted by alternately pulsed LEDs 27 and 28 contained within module 20b, reflecting off surface 40 and returning to module 20b as light ray $N_3$. It is noted that some of the light rays that are emitted by modules 20a and 20b may travel through material 60 by total internal reflection, which disturbs, or changes, the polarization of these light rays. This can be dealt with, however, by mating material 60 with tinted material (not shown), which has a higher refractive index than material 60. These will then enter the tinted material and become trapped between the surfaces of the tinted material because of its high refractive index.

As mentioned above, the point at which a force is applied to photoelastic material 60 is determined through triangulation. As shown in FIG. 2, $\theta_3$ ($\theta_4$) is the angle between reflected light ray $M_3(N_3)$ and the bottom edge 50 of screen 100. Lines 1 and 2, which pass through the centers of modules 20a and 20b, respectively, slope at an angle of 45 degrees with respect to bottom edge 50. Thus, $\theta_3 = 45° - \theta_1$, and $\theta_4 = 45° - \theta_2$, where $\theta_1$ and $\theta_2$ are the angles obtained from equation (1). The x and y coordinates of point C as measured from the center of module 20a, are then given by:

$$x = \frac{w \tan\theta_4}{\tan\theta_3 + \tan\theta_4}, \text{ and} \quad (3)$$

where w, as shown in FIG. 2, is the horizontal distance between the centers of modules 20a and 20b.

Total Force

By using a linear approximation (which is sufficiently accurate for touch-screen applications) of the change in the level of electrical current outputted by photodiodes 24 and 25 of either module 20a or 20b in response to a change in the level of light rays impinging thereon, a good approximation of the total force applied at point C of FIG. 2 can be readily obtained using either the following equation (5) or equation (6), which are derived from the equation taught by Leo Levi in his text *Applied Optics*, John Wiley and Son, 1980, Vol II, pg. 252:

$$F_{ta} = K_1 (r_a \Delta I_{ao})^{\frac{1}{2}} \quad (5)$$

$$F_{tb} = K_1 (r_b \Delta I_{bo})^{\frac{1}{2}} \quad (6)$$

where $\Delta I_{ao}$ ($\Delta I_{bo}$) is the change in the sum of the current signals outputted by photodiodes 24 and 25 of module 20a (20b) in response to changed circularly polarized light emitted by module 20a (20b); $K_1$ is a constant obtained upon calibrating screen 100, as will be discussed below, and $r_a$ ($r_b$) is the distance from the center of module 20a (20b) to the point of touch and can be derived from the x and y coordinates determined from equations (3) and (4) as follows:

$$r_a = (x^2 + y^2)^{\frac{1}{2}}, \text{ and} \quad (7)$$

$$r_b = ((w-x)^2 + y^2)^{\frac{1}{2}} \quad (8)$$

Of course the total force determined when using either equations (5) or (6) is the same.

Normal Component

A polarized light ray, such as reflected ray $M_3$ ($N_3$) representing both circularly and linearly polarized light whose polarization has changed, is affected jointly by two force components that are perpendicular to the ray, i.e., a normal component $F_n$, which is normal to screen 100, and a component $F_a$ ($F_b$) which is parallel to the surface of screen 100 and perpendicular to the ray. The information that is derived from measuring changes in the polarization of a single type of polarized light is not sufficient to determine more than one component of a force applied to screen 100. When two different types of polarized light, such as linearly and circularly polarized light, are supplied to screen 100, the information derived from changes in the polarization of these light rays is greater. This increase in information is sufficient to determine more than one component of a force applied to screen 100. Further, three components of such a force (a normal component and two components parallel to the x and y coordinates of screen 100) can be determined by combining the results obtained from each of the polarized light rays.

Still referring to FIG. 2, the normal component $F_n$ of a force applied at point C can be determined from the total force applied at point C (determined from equations (5) or (6)) and either force $F_a$, or force $F_b$. In particular, $F_n$ can be calculated from either of the following equations:

$$F_n = (F_{ta}^2 - F_a^2)^{\frac{1}{2}} \text{ or} \quad (9)$$

$$F_n = (F_{ta}^2 - F_b^2)^{\frac{1}{2}} \quad (10)$$

where $F_{ta}$ and $F_{tb}$ are obtained from equations (5) and (6), respectively, and $F_a$ and $F_b$ are obtained from the following equations:

$$F_a = K_2 r_a \Delta I_{a1} + K_3 F_n, \text{ and} \quad (11)$$

$$F_b = K_2 r_b \Delta I_{b1} + K_3 F_n \quad (12)$$

In the above equations, $\Delta I_{a1}$ ($\Delta I_{b1}$) is the change in the sum of the current signals outputted by photodiodes 24 and 25 of module 20a (20b) resulting from a change in the polarization of linearly polarized light emitted by module 20a (20b); and $K_2$ and $K_3$ are calibration constants, which will be discussed below.

Tangential Components

The tangential components (i.e., a component $F_x$ parallel to the x coordinate of screen 100 and a component $F_y$ parallel to the y coordinate of screen 100) of the total force applied at point C can be now derived from the values obtained from equations (11) and (12), respectively, as follows:

$$F_x = F_a \sin\theta_3 + F_b \sin\theta_4, \text{ and} \quad (13)$$

$$F_y = -F_a \cos\theta_3 + F_b \cos\theta_4 \quad (14)$$

where the angles $\theta_3$ and $\theta_4$ are derived above.

Calibration Constants

The calibration constant $K_1$ of equations (5) and (6) can be derived by exerting a known force normal to photoelastic material 60. This can be accomplished by placing screen 100 in a horizontal (flat) position and placing a known weight on material 60. The x and y coordinates of the point at which the known weight is placed on material 60 are measured. The outputs from photodiodes 24 and 25 of both modules 20 are measured both with and without the known weight positioned on material 60 to determine the change in the current outputted by photodiodes 24 and 25. The values $r_a$ and $r_b$ are then derived from the above measurements using equations (7) and (8), respectively. The values obtained from the above measurements are substituted in either equation (5) or in equation (6) which is then rearranged to solve for the constant $K_1$.

The calibration constants $K_2$ and $K_3$ of equations (11) and (12) are derived in a similar manner in which the variables of equations (11) and (12) are obtained by placing a known weight (g) on screen 100 (such as the weight used to determine $K_1$) and tilting screen 100 around an axis parallel to bottom edge 50 upward from a flat position by a known amount, for example, 30° with respect to the horizontal plane. Under these conditions, the forces $F_n$, $F_a$ and $F_b$ can be derived from the following:

$$F_n = g \cos \alpha,$$

$$F_a = g \sin \alpha \cos \theta_5, \text{ and}$$

$$F_b = g \sin \alpha \cos \theta_6$$

where $\alpha =$ the angle at which screen 100 is tilted with respect to the horizontal plane and $\theta_5(\theta_6)$ is the angle measured between edge 50 and a line drawn from the center of module 20a (20b) to the location of the known weight. Equations (11) and 12 are solved simultaneously using the values obtained for the above forces to determine constants $K_2$ and $K_3$.

Figure 3:
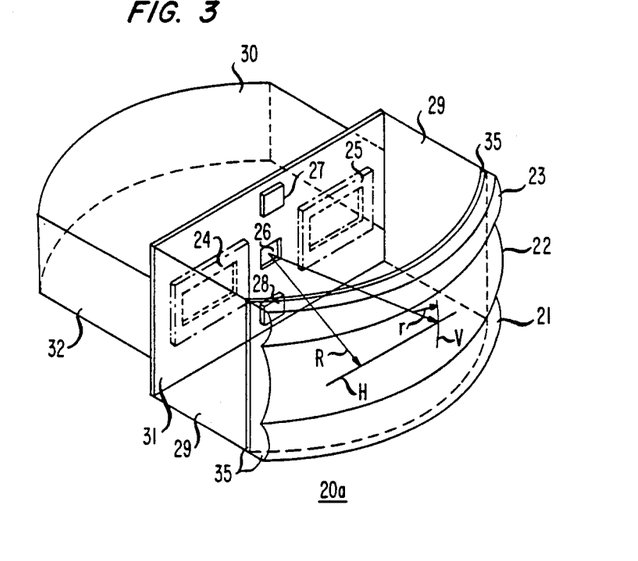
FIG. 3 is a perspective view of a module within the screen of FIG. 1 which transmits and receives light rays.

As shown more particularly in FIG. 3, each module includes light emitting diodes, or LEDs, 27 and 28 mounted on the front of printed wiring board 31 which is encapsulated within a clear plastic housing. LEDs 27 and 28 are alternately pulsed by a microprocessor causing them to alternately emit light rays. The latter travel through polarizer 35 and are focused approximately within the horizontal plane of touch-sensitive screen 100 by anamorphic lenses 23 and 21. Reflected, or returned, light rays are then focused by anamorphic lens 22 through polarizer 35 and hole 26 and onto rear curved surface 30 of module 20. Rear surface 30 diffusely reflects the rays onto photodetectors 24 and 25, which are mounted illustratively on printed wiring board 31 facing surface 30.

Anamorphic lenses 21, 22 and 23 are molded illustratively as a part of module 20 using a transparent acrylic material and have the same radius of curvature r. The radius of curvature r is measured between a vertical plane passing through the center of module 20, such as a vertical plane passing through line V, and the radius of curvature R of these lenses in the horizontal plane, such as a horizontal plane passing through line H. The radius of curvature r can be derived using the following relation:

$$r = R \frac{N-1}{N}$$

where N is the index of refraction of the material used to form lenses 21, 22 and 23.

Still referring to FIG. 3, polarizer 35 is a dual polarizer comprising a circular polarizer that is positioned behind lenses 22 and 23 and positioned directly in front of LED 27. Polarizer 35 also comprises a linear polarizer that is positioned behind lens 21 and positioned directly in front of LED 28, with its polarization axis being parallel to line H. The circular polarizer of polarizer 35 circularly polarizes light rays emitted by LED 27 and the linear polarizer linearly polarizes light emitted by LED 28. The circular polarizer also acts as the analyzer, or absorber, of all reflected light rays entering module 20 via lens 22.

Figure 5:
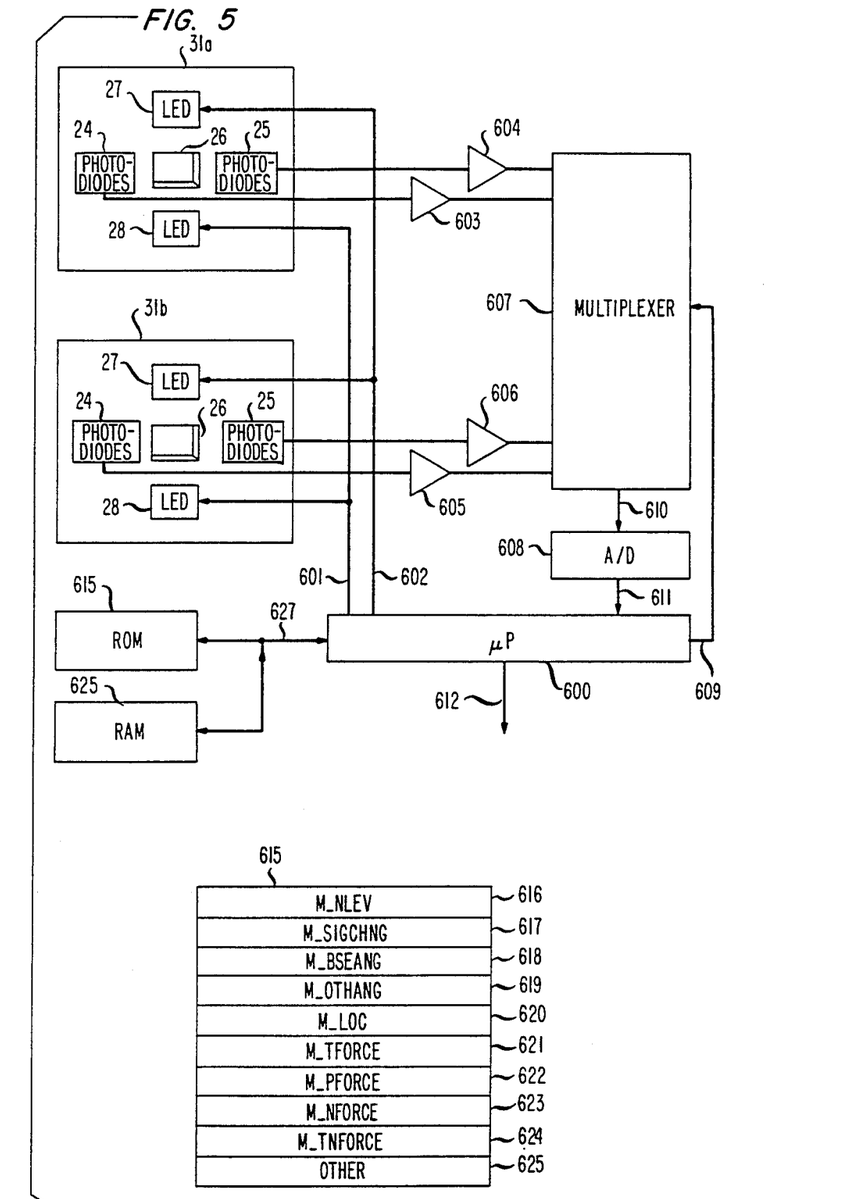
FIG. 5 is a block diagram of a system in which the invention may be practiced.

Turning now to FIG. 5, there is shown in block diagram form printed wiring boards 31a and 31b detached from modules 20a and 20b, respectively. Each printed wiring board 31a, 31b is controlled by microprocessor 600, which can be, for example, Intel microprocessor 8748, with internal RAM (not shown). Microprocessor 600 alternately pulses LEDs 27 and 28 of each printed wiring board 31a and 31b via leads 602 and 601, respectively. It is to be understood by the art that leads 602 and 601 can be duplicated so that a LED can be pulsed over a dedicated lead. Each of the currents outputted by each of the photodiodes 24, 25 is amplified by an associated one of amplifiers 603 through 606, respectively, which output current signals $I_{24}$ and $I_{25}$. The outputs from amplifiers 603 through 606 are multiplexed by multiplexer 607 to analog-to-digital converter 608 via lead 610. Microprocessor 600 is programmed to control multiplexer 607 via bus 609 and is programmed to repetitively address multiplexer 607 to obtain the outputs from amplifiers 603 through 606. Analog-digital converter 608 converts each analog current signal it receives into a binary coded value representative of the magnitude of the current signal before supplying the value to microprocessor 600 via multibit bus 611.

Upon receiving the binary coded values, one from each amplifier 603 through 606, microprocessor 600 stores them in RAM 625 via bus 627 and processes the values in accordance with the equations discussed above to determine whether a force applied to photoelastic material 60 has changed.

FIG. 5 also shows the program modules which are stored in ROM 615 and which are invoked by processor 600 to implement the equations discussed above.

In particular, program module M—NLEV 616 determines whether the new signal values are the result of noise by comparing these values with a predetermined noise level threshold. If the values do not exceed the noise threshold, processor 600 discontinues processing these values; otherwise, it invokes program module M—SIGCHNG 617.

M—SIGCHNG 617 determines whether the values of the individual signals supplied by modules 20a and 20b represent a change. It does this by comparing the values of the currently received signals with the values of priorly received signals. If no appreciable change is detected, processing of the newly received signals is stopped; otherwise, the remaining program modules in ROM 615 are invoked, one at a time, to process the changes as follows:

M—BSEANG 618 and M—OTHANG 619 establish the values of angles $\theta$, $\theta_3$ and $\theta_4$ in accordance with equations (1) and (2) and the geometry of screen 100, as discussed above.

M—LOC 620 implements equations (3) and (4) to determine the location of the applied force, as discussed above.

M—TFORCE 621 implements equations (5) and (6) to determine the value of the total force applied to screen 100 by averaging the results obtained from these two equations.

M—PFORCE 622 and M—NFORCE 623 represent routines within a program module which implements equations (7) through (12) to determine forces $F_a$, $F_b$ and $F_n$ of the applied force.

M—TNFORCE 624 implements equations (13) and (14) to determine tangential components $F_x$ and $F_y$.

As indicated at 625, ROM 615 may include other files for the storage of illustratively constants $k_1$, $k_2$ and $k_3$ or other routines and functions not pertinent to the foregoing description.

When the location and various forces described have been determined, processor 600 can illustratively pass these values to a video screen controller (not shown) via digital bus 612. The video screen controller responds accordingly by, for example, moving the video screen cursor in a direction corresponding to the direction that the user is pushing against a fixed location on screen 100 with his or her finger.

Figure 6:
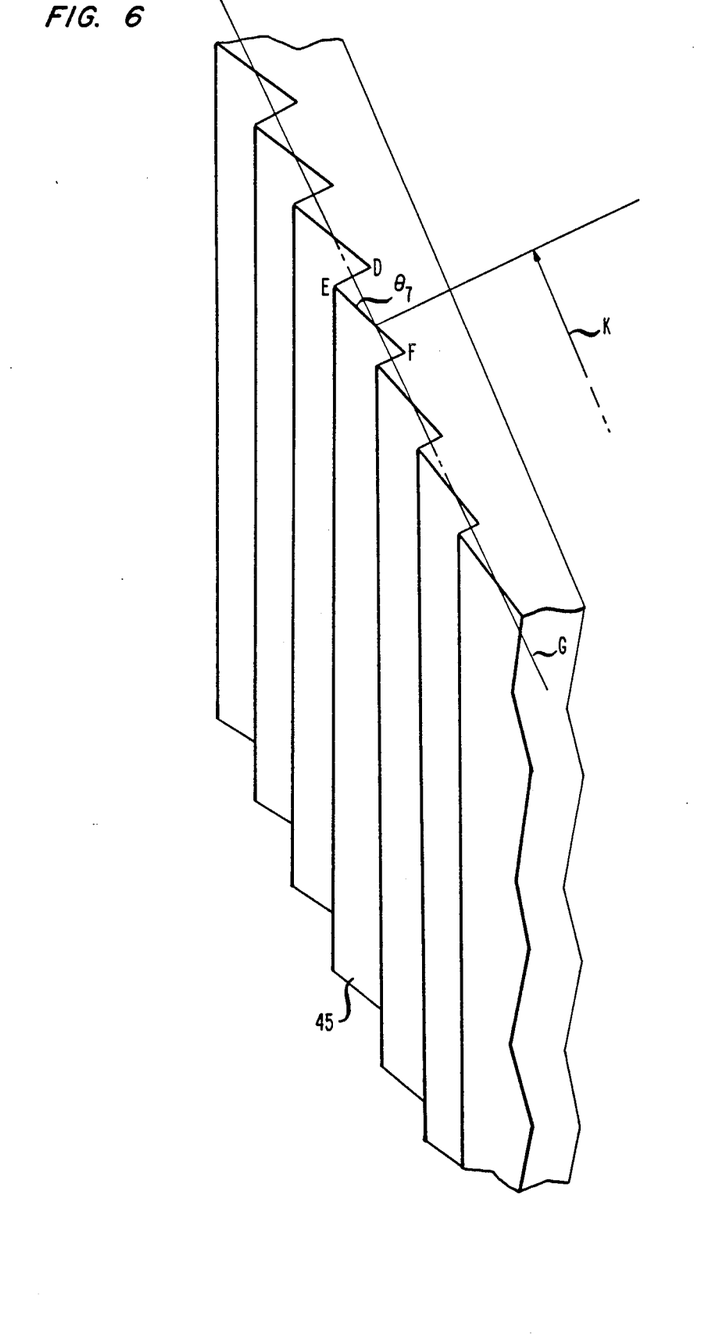
FIG. 6 illustrates the reflective side edges of the touch-sensitive screen shown in FIG. 1.

A detached segment of Fresnel type mirror 45 is shown in FIG. 6. In practice, mirror 45 can be constructed from molded plastic and coated with a metallic reflective material. As shown, mirror 45, in accordance with a feature of the invention, is grooved in a sawtooth fashion to form wedges so that the face of each wedge, such as face EF, is perpendicular to light rays emitted by a module 20a that is opposite to mirror 45. Also, edge ED of each wedge of mirror 45 is formed to be perpendicular to edge face EF and thus parallel to an impinging light ray to avoid interfering with it. The angle $\theta_7$ is an interior angle between edge face EF and the line G passing through the center of edge ED and the corresponding edge faces of the other wedges. The wedges formed by edges ED and EF are arranged so that the angle $\theta_7$ increases in value between adjacent wedges. In particular, the wedge closest to module 20a or 20b has the shallowest pitch, or angle $\theta_7$, and the wedge furthest from module 20a or 20b has the largest angle $\theta_7$ (For the purpose of illustrating the invention, the pitch of each succeeding wedge shown in FIG. 6 is exaggerated.)

The angle $\theta_7$, and, in turn, the pitch of a edge, is established in relation to the width of screen 100 (w of FIG. 2) and the distance k, which is measured from the center of an adjacent module 20a or 20b to the center of the respective wedge, and is determined as follows:

$$\theta_7 = \arctan \frac{k}{w}$$

The spacing of the grooves, i.e., the distance between points D and F, are made smaller than the average area of contact of a force applied to screen 100. However, the spacing should be sufficiently large, for example, approximately 0.25 millimeter, to permit mirror 45 to be easily molded or machined.

Figure 7:
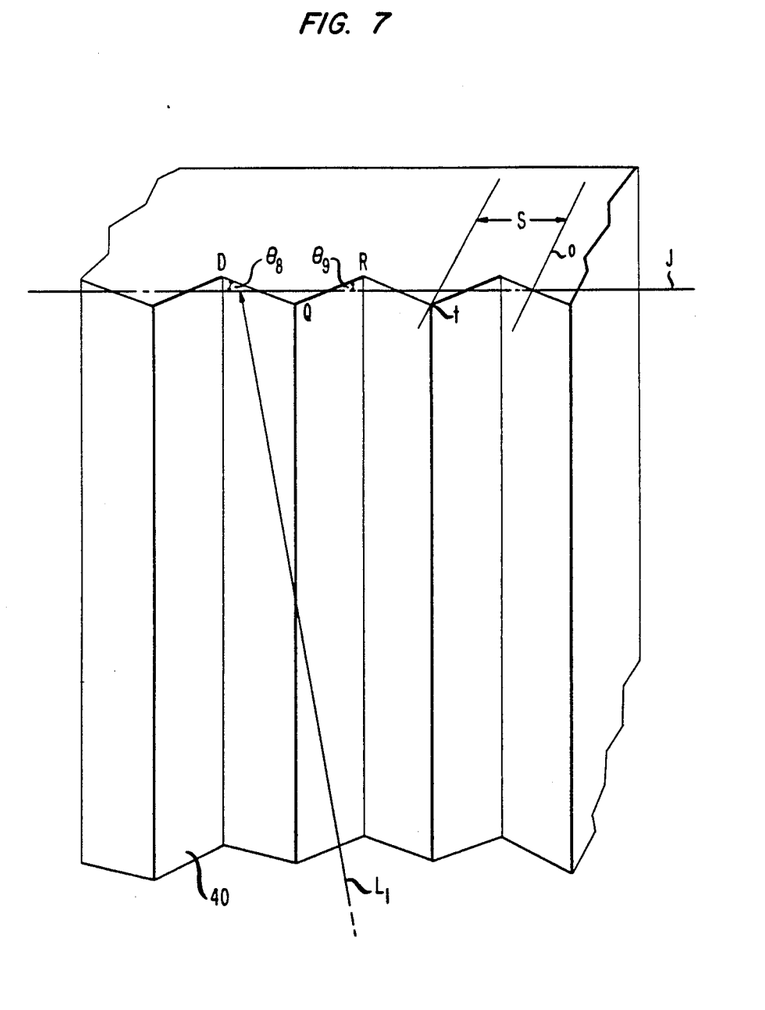
FIG. 7 illustrates the reflective top edge of the touch-sensitive screen shown in FIG. 1.

Referring now to FIG. 7, there is shown a detached segment of Fresnel type mirror 40. Fresnel mirror 40, in accordance with a feature of the invention, is in the form of an arc and comprises a plurality of wedges. Mirror 40 can be machined or molded from plastic and coated with a metallic reflective material. Referring to points P, Q and R, the angles $\theta_8$ and $\theta_9$ are obtained by passing a line, such as line J, through the apex of each wedge, such as the wedge formed by points P, Q, and R. Angles $\theta_8$ and $\theta_9$, which establish the pitch of the illustrated wedge, can be derived from the following general equation:

$$\theta_8(\theta_9) = \arcsin \frac{w}{2L_1} \left( \frac{1 - \sin^2 \frac{s}{L_1}}{1 + \frac{s}{2L_1^2} - \frac{s}{L_1}\sin \frac{s}{L_1}} \right)^{\frac{1}{2}}$$

where: s=distance between the line o which passes perpendicularly through the center of a wedge and the line t which passes perpendicularly through the center of mirror 40 when mirror 40 is in a flat (unarched) position (point t shown in FIG. 7 is assumed to be at the center of mirror 40); $L_1$= the radius of curvature of mirror 40 and is measured from the center of edge 50 of screen 100 (FIG. 1) to line J and w is the measurement shown in FIG. 2. For establishing angle $\theta_8$, s in the above equation is positive and for establishing the angle $\theta_9$, s in the above equation is negative.

Figure 8:
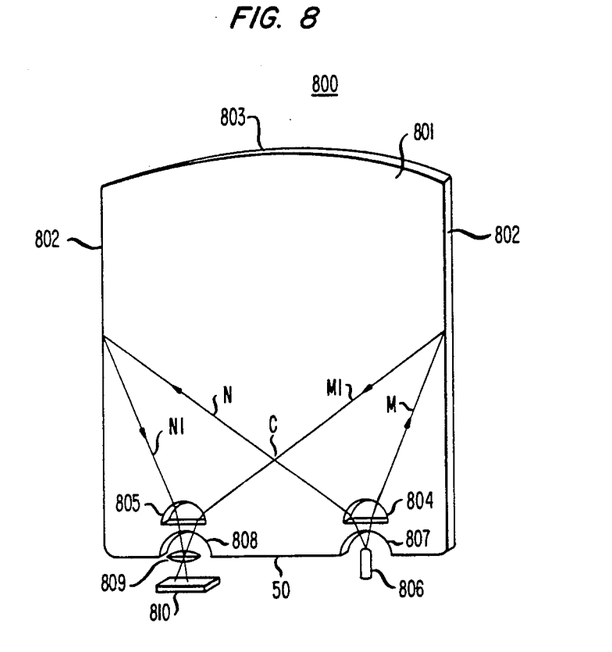
FIG. 8 is a block diagram of a second embodiment of my invention.

Turning now to FIG. 8, there is shown a second embodiment of my invention in which the location and magnitude of a force applied to screen 800 is determined using only a single type of polarized light. In this arrangement, LED 806 emits light rays which pass through linear polarizer 807. Linear polarizer 807 linearly polarizes these light rays at 45° to the horizontal, i.e., to the plane of the screen. Linearly polarized light rays M and N illustratively represent bundles of light rays emitted by LED 806 which enter photoelastic material 801. These rays are refracted by lens 804, which is formed in photoelastic material 801 and which is of a type commonly referred to as a "fish eye" lens. Light rays refracted by lens 804, such as rays M and N, impinge on side edges 802, where they are reflected toward lens 805. Light rays designated M1 and N1 are representative of reflected versions of rays M and N, respectively.

Reflective side edges 802 and top edge 803 are formed into Fresnel-type grooves, or wedges, to simulate a screen shaped into an ellipse having reflective side edges. It is well known that if a light emitter, such as a light emitting diode, is placed at one focus of an elliptical surface, and the light is reflected at the edges of the surface, the light will be reflected toward the other, or second, focus.

Reflected light rays M1 and N1 impinge on lens 805, which is similar to lens 804. This lens bends these rays into circular polarizer 808. Because rays M1 and N1 are linearly polarized, a portion of these rays pass through circular polarizer 808 and enter lens 809, where they are focused onto photodiode array 810. When no force is applied to photoelastic material 801, the photodiodes contained within array 810 are more or less equally illuminated by light rays passing through polarizer 808. The ensuing signals outputted by these diodes under normal conditions are treated as background signals.

As mentioned above, when photoelastic material 801 is touched by the user, such as at point C, the polarization of light signals, such as linearly polarized light rays M, N, M1 and N1, passing through that point is changed. Because the polarization of these signals changes, the amount of light, as represented by rays M1 and N1, that passes through circular polarizer 808 changes. This change in light is focused onto particular photodiodes of photodiode array 810, which in turn output an increased signal level.

I have recognized that the output from each photodiode can be plotted as a function of its distance on the array from the photodiode that is outputting the greatest signal. I have further recognized that the resulting waveforms can be used to determine the magnitude of a force applied to photoelastic material 801, as well as its components. The position, or location, of the applied force can then be determined from the position of the response on photodiode array 810.

Figure 9:
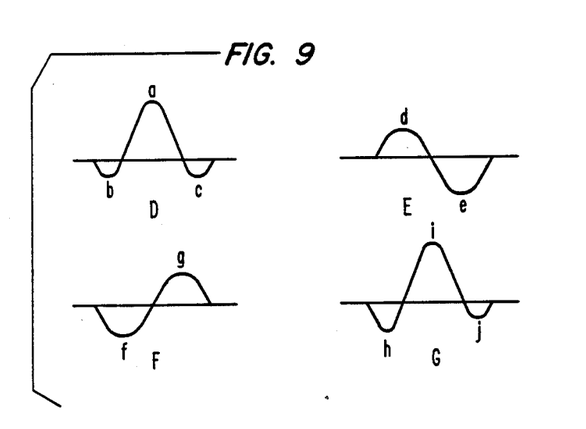
FIG. 9 illustrates various waveforms that are indicative of various directions in which a force may be applied to the touch-sensitive screen shown in FIG. 8.

FIG. 9 illustratively shows four typical waveforms that may be constructed from the photodiode outputs of array 810 for various applied forces. Waveform D is an asymmetrical bipolar response that is the result of a force that is applied perpendicularly to photoelastic material 801. The abscissa of each waveform represents the position of each diode on photodiode array 810 and the ordinate of each waveform represents increasing light. The width of segment "a" is indicative of the contact area directly beneath the applied force and the height of segment "a" is indicative of the magnitude of the applied force. (The width of "a" also increases with the thickness of material 801.) Segments "b" and "c" are indicative of a force created at the fringes of the contact area and are representative of a force applied parallel, or tangential, to the surface of material 801.

When a force is applied perpendicular to an elastic material, internal stress components parallel to the surface of the elastic material are created. These stress components are the result of material being "squeezed out" from under the contact area and pressing against surrounding material. Segments "b" and "c" are representative of such forces, which decrease the amount of light that normally passes through circular polarizer 808.

Waveforms E and F are the result of a force that is applied parallel to the surface of photoelastic material 801 in respective directions. It is seen that segments "e" and "f" of waveforms E and F, respectively, represent a decrease in light transmission through polarizer 808 for light rays passing through material 801 at the point of contact. Segments "d" and "g" of waveforms E and F, respectively, represent a slight increase in the amount of light that impinges on photodiode array 810. These segments of waveforms E and F represent the shear components of the applied parallel force and are representative of shear forces whose direction makes an angle of 45° with the surface of material 801.

Waveform G is representative of a force that is applied at an angle to photoelastic material 801. Such a force typically has a normal and tangential components which are derived from a linear approximation of the sum of waveforms D and F (a representation of the sum of waveforms D and E is not shown, but could be constructed in a similar manner). Thus, from the construction of waveform G, the amplitude of segment c is proportional to the normal component of the applied force and the difference between segments h and j is proportional to the magnitude of the tangential components of the applied force.

The signal outputted by each photodiode contained within photodiode array 810 may be multiplexed to a microprocessor in a manner similar to that described in connection with FIG. 5. Upon receiving a signal from a photodiode, the microprocessor may store it in associated memory at a location that is indicative of its location on photodiode array 810. The resulting memory layout can be in the form of a matrix, in which each memory location of the layout contains a value that corresponds to the level of the signal outputted by a respective photodiode. When the microprocessor receives and stores all such values, it may invoke a program contained within the memory. The program may be arranged to test each value to determine if a change in the level of the signals outputted by array 810 has occurred. If no such change has occurred, the program could exit at a point in the program indicative of either that no force has been applied to screen 800 or that there is no change in a force applied to screen 800. If a change is detected, the program could be arranged to scan the matrix of values to locate the greatest, or center, value. This center value, or values, is representative of one of the peak values of one of the waveforms shown in FIG. 9, for example the peak of segment "a" of waveform D. The program would then assemble the cluster of values stored on either side of the center value to form the resulting waveform to determine the direction of the applied force.

The position of a force applied to material 801 is determined as follows:

Typically, two different bundles of reflected light rays pass through the point at which force is applied to the surface of screen 800. These two bundles of reflected light rays, which are illustrated as rays M1 and N1 in FIG. 8, strike two different points on array 810. As a result, the signals outputted by two different clusters of photodiodes will change. A waveform can therefore be constructed from the signals outputted by each cluster of photodiodes. The position of the center of each cluster can then be used in a method of triangulation to determine the position of the applied force. By using just one of the constructed waveforms, the normal component of the applied force can be determined from the positive portion of the waveform. The accuracy of the resulting value can then be checked with the value derived from the second waveform. The components of the applied force that are analogous to forces $F_a$ and $F_b$ shown in FIG. 5 can be derived from the negative segments of the constructed waveform and then combined to determine the tangential components.

Conclusion

While the focus of the above description is on a touch-sensitive screen, my invention may also find use in other areas, such as robotics. For example, my invention could be used when it is desirable to control the force that a machine applies to an object or to control the tangential force that is applied to an object in order to rotate the object to bring it into alignment. The transparency of my device also allows an object to be imaged tactually and visually at the same time. It is advantageous in these robotic applications to have the light enter and leave the photoelastic sheet via a face rather than an edge. This enables the force at any number of points to be unambiguously determined (up to the spatial resolution of the screen). This can be done by reflectorizing, and grooving or roughening one face, and having the light enter and leave through the other. It is further advantageous for the rays to enter obliquely and leave perpendicularly (or vice-versa); this ensures that forces will cause a net effect on the polarization of the light rays instead of having a cancelling effect on incoming and outgoing rays.

This robotic device would have the light source(s) and detector(s) coupled to the photoelastic sheet by means of a lens arrangement. For example, the sheet could be illuminated by three collimated beams, oblique to its surface and viewed by a video camera tube or detector array via a field lens or mirror that would select rays perpendicular to its surface. The reflecting surface of the photoplastic sheet would be roughened or grooved in appropriate directions to provide the reflection angles needed to reflect rays toward the camera. Positioning a circular analyzer in front of the camera, and linear polarizers in front of the light sources, allows force components to be derived.

A more compact implementation can be accomplished by combining a photoelastic sheet having one grooved reflective surface and a photodiode array. A plate having a thin coating on its top surface to partially frustrate internal reflections is placed between the photoelastic sheet and photodiode array. To derive the tangential components of a force applied to the photoelastic sheet, two mutually perpendicular linearly polarized light rays are focused through the plate by total internal reflection, with some fraction of the light passing through the coating obliquely into the photoelastic sheet. The reflective surface on the photoelastic sheet reflects the light rays perpendicularly toward the photodiode array. To determine the normal component of the applied force, another light ray is made to pass through the plate at a slightly oblique angle. A retarder placed between the photoelastic sheet and the top of the plate is used to rotate the polarization of this latter light ray to a direction sensitive to the normal force.

Further, a variation of the device shown in FIG. 8 may be constructed in which the light transmitting module 806 includes two alternately pulsed LEDs, a circular polarizer and a linear polarizer. The receiving module comprises a polarizer, a focusing lens and a charged coupled array (CCD). In operation, the LEDs are alternately pulsed. In the absence of a force applied to the screen, each LED causes a uniform illumination of the CCD array. However, when a force is applied to a point on the surface of the photoelastic screen, the polarization of light rays passing under that point and through the screen will change, thereby causing a variation in the illumination at two points on the CCD array. The position of touch can be derived from the position of those two points on the CCD array. As explained above, the total force applied to the screen can then be determined from the total light transmission when the LED that is positioned behind a circular polarizer is pulsed. The tangential component of that force can be determined from the light transmission produced by a LED positioned behind a linear polarizer.

What is claimed is:

1. A touch-sensitive device comprising
a screen,
means for generating and directing polarized signals having at least a predetermined polarization into said screen, said screen causing changes in the polarization of ones of said polarized signals which pass through a point on said screen at which a force is applied, and
means responsive to said ones of said signals having changes in said polarization for determining the location of said point at which said force is applied on said screen.

2. The invention set forth in claim 1 wherein said determining means includes means for collecting said ones of said polarized signals and for generating output signals having levels indicative of the changes in the polarization of respective ones of said ones of said polarized signals.

3. The invention set forth in claim 2 wherein said determining means further includes means for determining the total value of said applied force as a function of changes in individual ones of said output signals.

4. The invention set forth in claim 2 wherein said ones of said polarized signals enter said collecting means at an angle and said determining means further includes means for determining said angle and for deriving the location of said point as a function of said angle, said determining means determining said angle from the ratio of the sum of the levels of individual ones of said output signals to the sum of the levels of other individual ones of said output signals.

5. The invention set forth in claim 4 wherein said polarized signals include linearly and circularly polarized signals.

6. The invention set forth in claim 5 wherein said touch-sensitive device further includes means for determining the total value of said applied force as a function of a change in said output signals resulting from said changes in the polarization of said circularly polarized signals.

7. The invention set forth in claim 5 wherein said touch-sensitive device further includes means for determining the values of two components of said applied force that are parallel to a surface of said screen and that are perpendicular to the direction of propagation of said polarized signals at said point of said applied force as a function of said total force and a change in said output signals resulting from changes in the polarization of said linearly polarized signals.

8. The invention set forth in claim 7 wherein said touch-sensitive device further comprises means for determining the tangential components of said applied force that are parallel to x and y coordinates of said screen as a function of said two perpendicular forces and said entering angle.

9. The invention set forth in claim 2 wherein said touch-sensitive device further comprises means for reflecting toward said collecting means said polarized signals whose polarization has changed.

10. The invention set forth in claim 1 wherein said screen is comprised of photoelastic material.

11. A touch-sensitive device comprising
a screen,
means for focusing polarized signals from a source into said screen, said polarized signals having at least a predetermined polarization, said screen causing changes in the polarization of ones of said polarized signals when they pass through a point on said screen at which a force is applied,
module means for receiving said ones of said polarized signals and for outputting signals indicative of the extent of said changes, said ones of said polarized signals entering said receiving means at an angle, and
means responsive to changes in the level of said outputted signals for determining said angle and for determining the location of said applied force on said screen as a function of said angle.

12. The invention set forth in claim 11 wherein said source and said receiving and outputting means are positioned in proximity to a corner of said screen.

13. The invention set forth in claim 11 wherein said screen is comprised of a photoelastic material.

14. The invention set forth in claim 11 wherein said determining means further includes means for determining the total value of said applied force as a function of the level of individual ones of said output signals.

15. The invention set forth in claim 11 wherein said focused polarized signals include linearly and circularly polarized signals.

16. The invention set forth in claim 15 wherein said touch-sensitive device further comprises means for determining the value of said applied force as a function of a change in said output signals resulting from changes in the polarization of said circularly polarized signals.

17. The invention set forth in claim 16 wherein said touch-sensitive device further comprises means for determining the value of two force components of said applied force which are parallel to a surface of said screen and which are perpendicular to the direction of propagation of said polarized signals at said point on said screen as a function of the level of said applied force and a change in said output signals resulting from changes in the polarization of said linearly polarized signals.

18. The invention set forth in claim 17, wherein said touch-senistive device further comprises means for determining the value of two other components of said applied force that have a direction corresponding to x and y coordinatates of said screen, respectively, as a function of said parallel force components and said angle.

19. The invention set forth in claim 11 wherein said screen includes reflective side and top edges for reflecting said polarized signals that impinge thereon toward said receiving and outputting means.

20. A method of locating a point on a body of photoelastic material at which a force is applied comprising the steps of
generating and directing polarized signals having at least a predetermined polarization into said photoelastic material, said material causing changes in the polarization of said signals which pass through said point, and
determining the location of said point on said material as a function of said changes.

* * * * *